ns patent office                                    3,608,392
United States Patent Office                              Patented Sept. 28, 1971

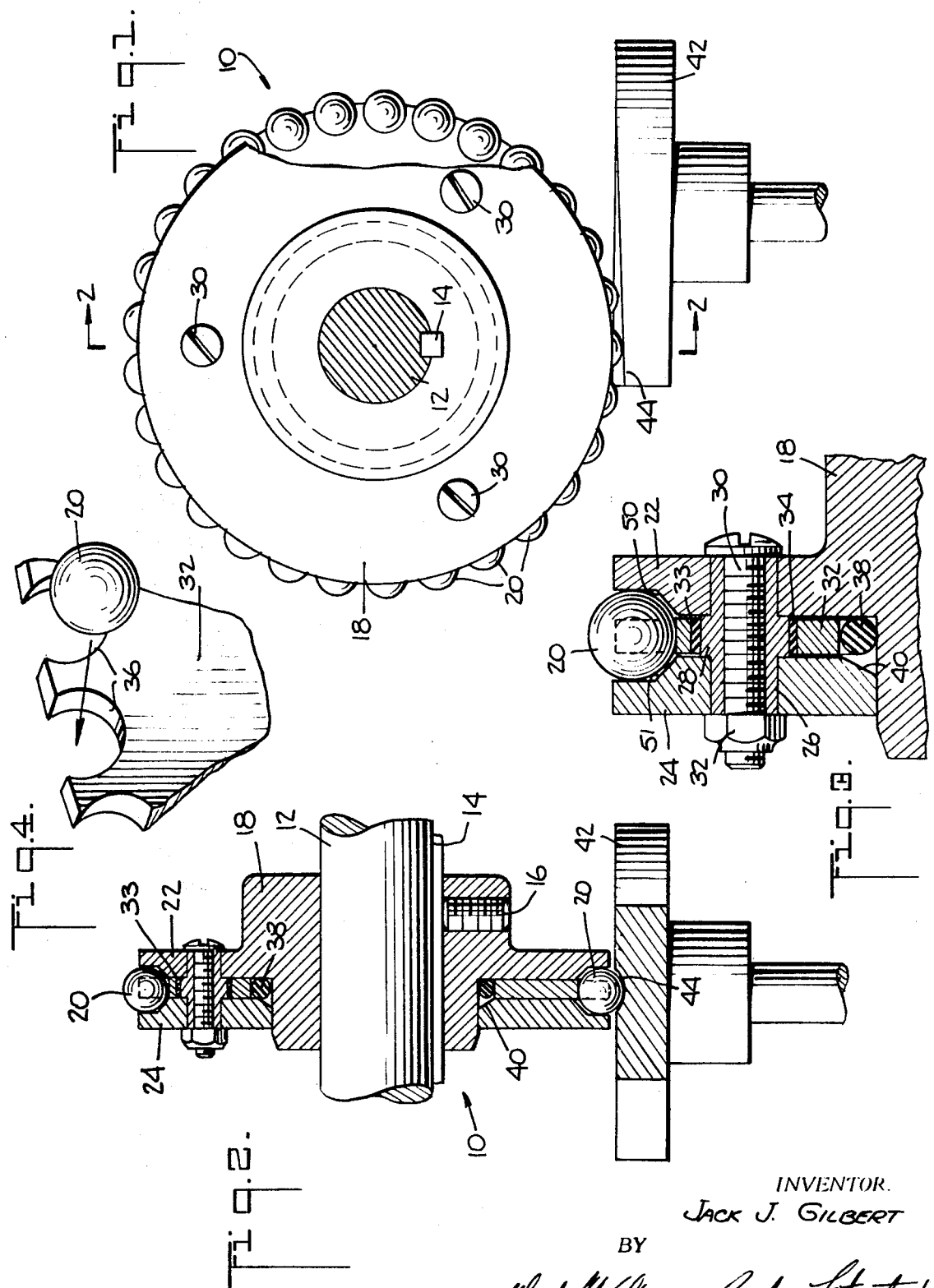

3,608,392
RIGHT ANGLE DRIVE
Jack J. Gilbert, Suffern, N.Y., assignor to Spyro
Dynamics Corporation, Northvale, N.J.
Filed June 15, 1970, Ser. No. 46,306
Int. Cl. F16h 1/18, 55/06
U.S. Cl. 74—424.5                                       12 Claims

ABSTRACT OF THE DISCLOSURE

A right angle drive comprising a driven gear having its teeth mounted for radial movement restrained by a resilient ring and driven by a mating gear engageable with said teeth.

---

This invention relates to power transmission means and more particularly to right angle drives.

Right angle drives are known wherein a ball-toothed gear is driven by a face gear having a spiral groove therein into which one or more ball-teeth fit. The ball-toothed gear has a plurality of spaced, spherical balls mounted at the periphery thereof so as to be free to rotate in any direction and acting as gear teeth. Each ball engages the spiral groove on the face gear, and as the face gear rotates, the contacting ball or balls follow the groove, causing the ball-toothed gear to rotate. Such a drive is shown in detail in my co-pending application Ser. No. 843,133 filed July 18, 1969.

While right angle drives of the class aforesaid have been used with success, difficulties have been experienced because of commercial tolerances, etc. with the spacing of the balls with respect to the axis of the output shaft. Thus, with drives of the type described, it is important to maintain a snug fit between each ball tooth and the receiving groove in order to avoid backlash and an undesirably high noise level, and if the location of some of the balls is eccentric with respect to the axis of the output shaft, the engagement between the balls and the groove is variable as the ball toothed gear rotates and therefore, the desired conditions are not obtained.

In accordance with the present invention, the above-described problems are overcome by mounting a portion of the driven gear so that the teeth thereof are permitted to move radially of the output shaft and by mounting the driven gear so that the tooth or teeth of the driven gear which are closest to the axis of rotation of the driven gear penetrate fully into the driving portion of the driving gear and so that the tooth or teeth of the driven gear which are spaced farther from the axis of the driven gear will properly and fully penetrate by radial adjustment. Thus, in the case of the ball toothed gear the balls are limited with respect to radially outward and circumferential movement and are restrained with respect to radially inward movement by a resilient ring. The ball toothed gear is preferably rotatably mounted so that the ball or balls nearest the axis of rotation engage the groove of the face gear under pressure directed radially outward of the ball toothed gear with consequent compression of the resilient ring and as the face gear groove is engaged by the other balls, the resilient ring is compressed as such other balls move radially inwardly but such other balls still fully penetrate the face gear groove. In this manner, each ball is snugly received in the face gear groove as the ball toothed gear rotates thereby eliminating backlash and undesirable noise.

Other objects and advantages of the invention will be apparent from the following detailed description of a presently preferred embodiment thereof, which description should be considered in conjunction with the accompanying drawings in which:

FIG. 1 is a side elevation of a right angle drive constructed according to the concept of this invention;
FIG. 2 is a sectional view taken along the line indicated at 2—2 in FIG. 1;
FIG. 3 is an enlarged, fragmentary sectional view showing details of construction of the mounting means for ball teeth; and
FIG. 4 is an enlarged, fragmentary perspective view showing a ball tooth and ball tooth retainer means.

In the embodiment of the invention illustrated, and with particular reference to FIGS. 1 and 2, the right angle drive includes a ball-toothed gear indicated generally at 10, which is carried on a rotatable shaft 12 to which it is keyed, as at 14, and secured by a set screw 16, FIG. 2, provided for the purpose. The ball gear comprises a wheel body 18, along whose periphery are a multiplicity of identical, equally spaced teeth, each of which is a spherical steel ball 20 and, may, for example, be a hardened steel ball of the type used in ball bearings. Each ball is free for rotation in all directions about its geometric center, all such centers being in a plane perpendicular to the axis of rotation of such a gear.

As best seen in FIG. 3, the wheel body 18 has a peripheral flange 22. A disc 24 is mounted in face-to-face relationship with respect to said flange 22 and in spaced relationship with respect thereto by means of a bushing 26 having a shoulder 28. A screw 30 and a nut 32 clamps the disc 24 and the peripheral flange 22 against the shoulder 28. A ball retainer 32 is interposed between the disc 24 and the peripheral flange 22 and has openings 34 for receiving the shoulder 28 with its surrounding annular elastic grommet 33 hereinafter described in greater detail. As best seen in FIG. 4, the retainer 32 is provided with a notch 36 for each ball 20. The walls of the notches are slightly greater than a semi-circle to retain the balls and have a diameter slightly larger than that of the balls 20 to permit them to rotate freely. The thickness of the retainer 32 is slightly less than the width of the shoulder 28, FIG. 3, for purposes of allowing free radial movement thereof. The width of the shoulder 28 is selected in conjunction with the dimensions of the flange 22 and the disc 24 so that the faces of the latter adjacent the ball 20 will be spaced apart by a distance slightly greater than the diameter of the ball 20, and the flange 22 and the disc 24 are provided with inclined surfaces 50 and 51, respectively, spaced from the balls 20 to permit radially inward movement of the balls 20. In normal use, the balls 20 will always be spaced from said surfaces 50 and 51 as shown in FIGS. 2 and 3, and inward movement of the balls 20 will be limited by compression of the grommet 33 by the retainer 32.

As shown in FIGS. 2 and 3, a resilient ring 38 is mounted on the wheel body 18 between the disc 24 and the peripheral flange 22 in a position radially inwardly of the ball retainer 32. The ring 38 may be fabricated from any suitable resilient material and may, for example, be made of rubber having durometer hardness of 35–40. Although the ring 38 shown has a circular cross-section, it may have any desired cross-sectional configuration, such as an ellipse, a square or a rectangle, for example. The inner diameter of the retainer 32 and the outer diameter of the resilient ring 38 are dimensioned so that the retainer 32 engages, and preferably, slightly compresses the ring 38, the ring 38 acting as the resilient restraining means opposing radial movement of the retainer 32 and hence, the balls 20. The disc 24 has a chamfer 40 to provide room for compression and distortion of the resilient ring 38.

If the openings 34 in the retainer 32 were merely made larger than the shoulder 28 and the elastic grommet 33 were omitted, the balls 20 would be free to move radially against the force applied by the resilient ring 38. However, since the openings 34 are circular to permit the necessary movement of the retainer 32 regardless of which ball 20 engages the face of the driving gear 42, the retainer would also be free to rotate by a small amount around the axis of the gear 10 thereby introducing backlash in the drive. Accordingly, grommet 33, which may be made of the same material as the ring 38, is included intermediate the shoulder 28 and the retainer 32. The grommet 33 resists rotational movement of the retainer 32 sufficiently to prevent any appreciable backlash but is sufficiently compressible to permit the desired radial movement of the balls 20 and compression of the ring 38. Preferably, the grommet 33 has a sliding fit over the shoulder 28 and into the opening 34 and has a width less than the distance between the facing surfaces of the flange 22 and the disc 24. Mere use of the grommets 33 with omission of the ring 38 is not desirable because the force resisting radial movement of the balls 20 would not be substantially equal for all balls 20.

Referring to FIGS. 1 and 2, the ball gear 10 is driven by a rotatable, driven, face gear 42, by engagement of the balls 20 thereof in a spiral channel or groove 44 in the face of the gear 42. Preferably, the spiral channel or groove 42 is a regular or Archimedes spiral so that the movement of the ball gear 10 will be uniform. In cross-section, and as shown in FIG. 2, the groove 44 is arcuate and has a radius slightly greater than that of the balls 20. In order to prevent backlash or rotation of the gear 10 relative to the gear 42 without being driven by the latter, the balls 20 must seat in the bottom of the groove 44 and thereby be snugly received therein but not prevented from rotation. As a practical matter, with commercial manufacturing processes and tolerances, not all the balls 20 will have their groove engaging faces spaced equally from the axis of the output shaft 12, the shaft 12 may be slightly eccentric and/or the groove 44 may have small variations in depth. Accordingly, when the gear 10 is located with respect to the gear 42 so that one or more of them will seat in the bottom of the groove 44, others may not engage the bottom of the groove 44 or may press hard against the bottom of the groove 44 as the gear 10 is rotated. When this occurs, there is undesirable backlash, noise and wear.

However, with the construction of the gear 10 shown, the balls 20 are permitted to move radially to a limited extent and to an extent sufficient to overcome such problems. Inward movement of the balls 20 is resisted by the resilient ring 38 and the grommets 33, but the force applied thereby is much less than when the balls 20 are radially fixed. In addition, by suitably selecting the relative positions of the gears 10 and 42, all the balls 20 may have radially outward pressure applied to them by the ring 38 when they are in the groove 44 which will not only prevent backlash but also compensate for wear of the groove 44 and the balls 20.

In the preferred embodiment, the spacing of the shaft 12 from the groove 44 is selected so that each ball 20 which comes in contact with the bottom of the groove 44, such as the ball 20a indicated in FIG. 1, will move radially inwardly by a small amount thereby compressing the ring 38 and the grommets 33 and causing such ball to apply slight pressure to the groove 44 directed generally perpendicular to the face of the gear 42. However, it is also possible to set the spacing of the shaft 12 from the groove 44 so that the ball 20 which has its groove engaging surface nearest the axis of the shaft 12 merely engages the bottom of the groove 44 without compressing the ring 38 or the grommets 33 and the other balls 20 having their groove engaging surfaces farther from the axis of the shaft 12 will compress the ring 38 and the grommets 33 as they contact the bottom of the groove 44.

As the face gear 42, FIG. 1, is rotated, each ball 20, in turn, enters into the groove 44 and for each revolution of the gear 42 is displaced through an angle dependent upon the pitch of the spiral. Each ball 20 will, in turn, engage the bottom of the groove 44 substantially eliminating backlash and undesired noise. The wall of the groove 44 may be made of hardened steel so as to minimize wear. Of course, both the ball and the groove may be lubricated to minimize friction so as to cause the ball to ride in the sockets on a film of lubricant.

In one embodiment of the invention which I have found to provide the desired results, the relevant dimensions were as follows:

| | | |
|---|---|---|
| Ball 20 diameter, inch | 0.375 | +0.0000 / −0.0002 |
| Diameter of ball centers, inch | 3.900 | ±0.001 |
| Retainer 32 outside diameter, inch | 4.000 | ±0.004 |
| Retainer 32 thickness, inch | 0.125 | ±0.001 / −0.000 |
| Retainer 32 inside diameter, inch | 2.012 | ±0.001 |
| Ring 38 outside diameter, inch | 2.129 | |
| Ring 38 inside diameter, inch | 1.734 | ±0.010 |
| Ring 38 cross-section diameter, inch | 0.139 | ±.004 |
| Ring 38 material | Rubber of 35–40 durometer | |
| Opening 34 diameter, inch | 0.480 | +0.004 / −0.000 |
| Grommet 33 wall thickness, inch | 0.0625 | +0.005 / −0.000 |
| Shoulder 28 diameter, inch | 0.355 | ±0.001 |
| Shoulder 28 width, inch | 0.126 | +0.001 / −0.000 |
| Spacing between faces of flange 22 and disc 24, inch | 0.376 | +0.003 / −0.000 |
| Diameter of ring 38 support, inch | 1.750 | +0.000 / −0.002 |
| Disc 24 chamfer: | | |
| Axially, inch | 1/16 | |
| Radially, inch | 1/8 | |
| Flange 22 outside diameter, inch | 4.000 | ±0.004 |

Although a preferred embodiment of the invention has been outlined and described, it will be apparent to those skilled in the art that such an embodiment is illustrative only in that various modifications may be made therein without departing from the principles of the invention and that the principles of the invention may be applied to other types of gear drives.

What is claimed is:

1. A gear drive comprising a first gear and a second gear both rotatably mounted, said first gear having a plurality of teeth and said second gear having surfaces engageable with said teeth, said first gear comprising a body, means slidably mounting said teeth on said body for movement radially thereof and resilient means acting intermediate said body and said teeth for resisting radial movement of the latter, and means mounting said gears in driving relation and with the distance between the axis of rotation of said first gear and said surfaces no greater than the distance between said axis and the tooth of said first gear nearest said axis.

2. A gear drive as set forth in claim 1 wherein said first and second gears are mounted with their axes of rotation at right angles, said teeth are spherical balls mounted for rotation in any direction about the centers thereof and said second gear is a face gear having a spiral groove of arcuate cross-section for receiving said balls.

3. A gear drive as set forth in claim 2 wherein said means slidably mounting said teeth comprises a retainer ring for receiving and retaining said balls and said body comprises a surface co-axial with the axis of rotation of said first gear and of a diameter smaller than the inner diameter of said retainer ring, said retainer ring being mounted around said surface, and wherein said resilient means comprises a ring of resilient material intermediate said retainer ring and said surface and in engagement therewith.

4. A gear drive as set forth in claim 3 wherein said body further comprises a flange mounted at one side of said balls, said retainer ring and said resilient means and a disc at the other side thereof, the spacing between the facing surfaces of said flange and said disc adjacent said balls being substantially equal to the diameter of said balls and the spacing between the facing surfaces of said flange and said disc adjacent said retainer ring being at least as great as the thickness of said retainer ring.

5. A gear drive as set forth in claim 4 further comprising bushings securing said flange and said disc together, said retainer ring having openings therein for receiving said bushings, and a grommet of resilient material intermediate each of said bushings and the wall of said opening surrounding the bushing.

6. A gear drive as set forth in claim 5 wherein the spacing between the facing surfaces of said flange and said disc adjacent said ring of resilient material is greater than the thickness of said last-mentioned ring and the width of said grommets.

7. A right angle drive comprising a rotatable ball-toothed gear, said ball-toothed gear including a wheel body, a plurality of balls, means mounting said balls on the periphery of said wheel body, a resilient ring mounted on said wheel body radially inwardly of said balls and in engagement with said mounting means and said body, and a face gear having a spiral groove on the face thereof and mounted adjacent said ball-toothed gear with at least one of said balls in said groove for driving said ball gear upon rotation of said face gear, the spacing between the bottom of said face gear groove and the axis of rotation of said ball-toothed gear being no greater than the radial distance between said axis and the outermost surface of the ball on said ball-toothed gear nearest said axis.

8. A right angle drive as set forth in claim 7 wherein said spacing is less than said radial distance.

9. A right angle drive as set forth in claim 7 wherein said wheel body comprises a pair of members having spaced surfaces in face-to-face relation and extending generally radially of the axis of rotation, said mounting means comprises a ring mounted between said surfaces and has a thickness no greater than said spacing and said resilient ring is mounted between said surfaces radially inwardly of said mounting means ring and has an external diameter at least as great as the internal diameter of said mounting means ring.

10. A right angle drive as set forth in claim 9 wherein said mounting means ring has a plurality of notches in the periphery thereof, one for each ball, for receiving and retaining said balls.

11. A right angle drive comprising a rotatable output shaft, a ball-toothed gear mounted on said shaft, said ball-toothed gear including a wheel body, a plurality of spherical balls mounted on the periphery of said wheel body, each ball being free for rotation in all directions about its geometric center, said wheel body having a peripheral flange, a disc, means mounting said disc in spaced, face-to-face relationship with respect to said peripheral flange, said last-named means including a plurality of bushings each having a shoulder, and means clamping said disc and said peripheral flange against opposite ends of the shoulders of said bushings, a ball retainer ring interposed between said disc and said peripheral flange, said retainer ring having openings therein through which said bushings extend and which are larger than the diameter of the shoulders thereon for allowing radial movement of said retainer, a resilient grommet surrounding each said shoulder and filling the space between said shoulder and the wall of the surrounding opening, the periphery of said retainer ring having a plurality of notches receiving said balls and the walls of said notches being slightly greater than a semicircle to retain the balls and yet permit them to rotate in all directions, the thickness of said retainer ring being slightly less than the width of said shoulder for permitting radial movement of said retainer ring, a resilient ring mounted on said wheel body between said disc and said peripheral flange in a position radially inwardly of said retainer ring and in engagement with said retainer ring, one of said disc and said flange having a chamfer adjacent said resilient ring to provide room for compression and distortion of said ring, and a face gear having a spiral groove on the face thereof and mounted adjacent said ball-toothed gear with at least one of said balls in said groove for driving said ball gear upon rotation of said face gear, the spacing between the bottom of said face gear groove and the axis of rotation of said ball-toothed gear being no greater than the radial distance between said axis and the outermost surface of the ball on said ball-toothed gear nearest said axis.

12. A ball-toothed gear comprising a wheel body having a pair of radially extending, circular members with radially extending surfaces in face-to-face spaced relation and having a cylindrical surface intermediate said surfaces and of smaller diameter than said members, a resilient ring mounted between said surfaces and around said cylindrical surface and in contact therewith, a retainer ring having a thickness less than the spacing between said surfaces and an internal diameter no greater than the external diameter of said resilient ring mounted around and in contact with said resilient ring, said retainer ring having a plurality of ball receiving and retaining notches in the periphery thereof, and a plurality of balls, one for each of said notches, mounted in said notches and between said surfaces and with a portion thereof extending outwardly of the peripheries of said members.

References Cited

UNITED STATES PATENTS 3,537,334   11/1970   Gilbert _____ 74—465X

LEONARD H. GERIN, Primary Examiner

U.S. Cl. X.R.

74—464